United States Patent
Saberan et al.

(10) Patent No.: US 7,229,118 B2
(45) Date of Patent: Jun. 12, 2007

(54) SLOUCH REAR SEAT SYSTEM

(75) Inventors: Mohammad Saberan, New Baltimore, MI (US); John R. Sims, South Lyon, MI (US)

(73) Assignee: Lear Corporation, Southfield, MI (US)

( * ) Notice: Subject to any disclaimer, the term of this patent is extended or adjusted under 35 U.S.C. 154(b) by 144 days.

(21) Appl. No.: 10/904,034

(22) Filed: Oct. 20, 2004

(65) Prior Publication Data

US 2006/0082182 A1     Apr. 20, 2006

(51) Int. Cl.
    *B60N 2/02*     (2006.01)
(52) U.S. Cl. .............. 296/65.01; 297/336; 297/341; 296/65.05; 296/65.09; 296/65.13; 296/65.16
(58) Field of Classification Search ............. 296/65.01, 296/65.05, 65.09, 65.13, 65.16; 297/334, 297/335, 336, 341
    See application file for complete search history.

(56) References Cited

U.S. PATENT DOCUMENTS

| | | | |
|---|---|---|---|
| 3,971,700 A * | 7/1976 | Boesten .................... | 435/280 |
| 3,982,787 A | 9/1976 | Moll | |
| 4,382,629 A * | 5/1983 | Froumajou ................. | 297/322 |
| 4,813,721 A | 3/1989 | Mora | |
| 5,112,109 A | 5/1992 | Takada | |
| 5,588,707 A * | 12/1996 | Bolsworth et al. ..... | 297/378.12 |
| 5,676,424 A | 10/1997 | Winkelhake | |
| 6,186,572 B1 | 2/2001 | Oh | |
| 6,375,255 B1 * | 4/2002 | Maruta et al. ................ | 297/15 |
| 6,550,863 B2 | 4/2003 | Dill et al. | |
| 6,598,926 B1 * | 7/2003 | Price et al. .............. | 296/65.09 |
| 6,695,378 B2 * | 2/2004 | Hanagan ................... | 296/65.01 |
| 6,827,394 B2 * | 12/2004 | Watanabe et al. ............ | 297/15 |
| 2002/0017797 A1 * | 2/2002 | Jach et al. ............... | 296/65.09 |
| 2002/0047287 A1 * | 4/2002 | Kawasaki .................... | 296/64 |

* cited by examiner

Primary Examiner—Lori L. Lyjak
(74) Attorney, Agent, or Firm—Earl LaFontaine, Esq.

(57) ABSTRACT

An automotive slouch rear seat with improved adjustability is provided including an upper seat back and a lower seat bottom. The upper seat back includes a fixed rear seat back, a pivotal seat back, and a sliding seat back. The pivotal seat back has an upper end and a lower end for connecting to the lower seat bottom. The sliding seat back is slidably engaged to the fixed rear seat back. The sliding seat back is rotatably engaged to the upper end of the pivotal seat back. The lower seat bottom includes a fixed rear seat bottom, and a sliding seat lower. The sliding seat lower is slidably engaged to the fixed rear seat bottom. The sliding seat lower is rotatably engaged to the lower end of the pivotal seat back. Also, an automotive slouch rear seat assembly and a method of assembling a pre-installation automotive slouch rear seat assembly are provided.

21 Claims, 4 Drawing Sheets

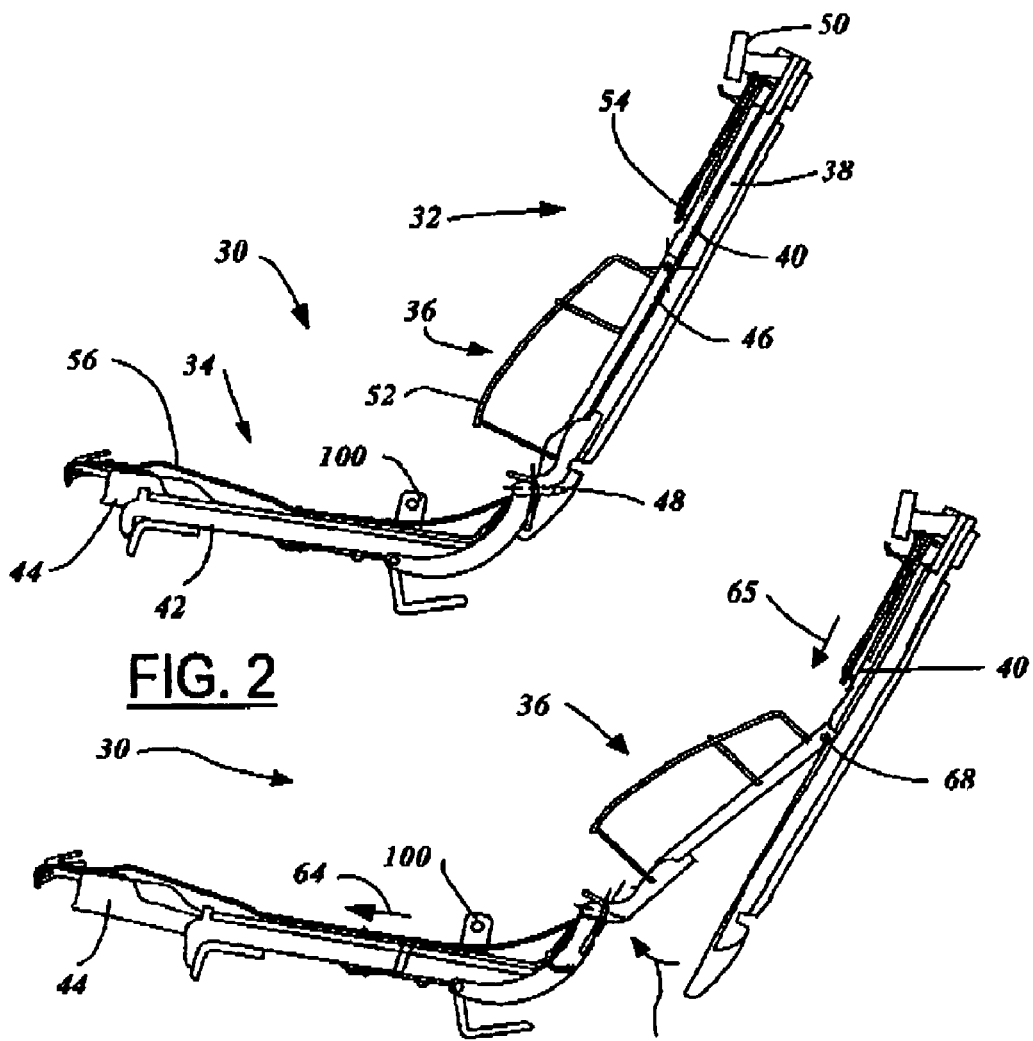
FIG. 2
FIG. 2A
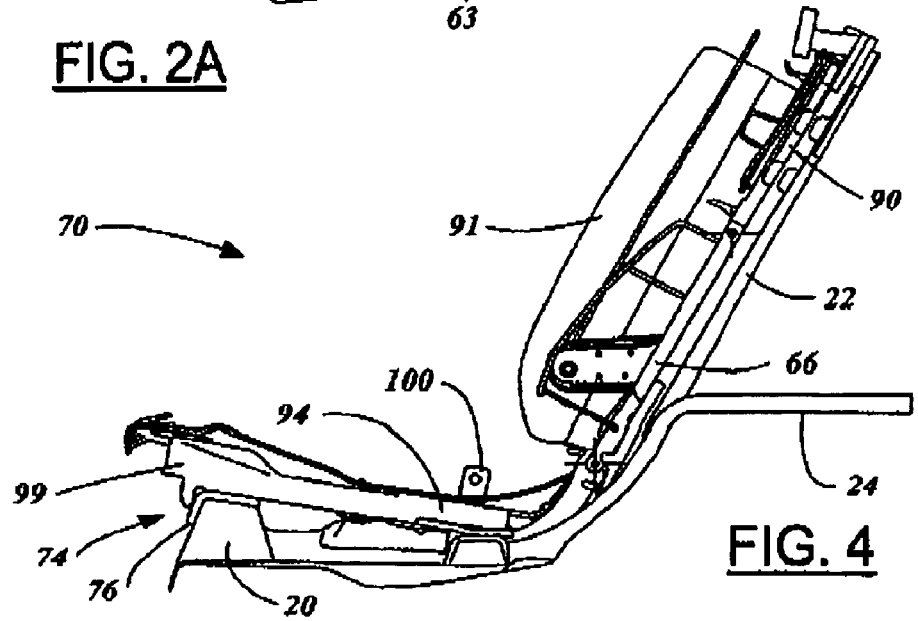
FIG. 4

SLOUCH REAR SEAT SYSTEM

TECHNICAL FIELD

The present invention relates generally to an automotive seat assembly and more particularly to pre-installation integral seat assembly and slouch rear seat system.

BACKGROUND OF THE INVENTION

Automotive rear seat and seat assemblies play an important role in automobile design and functionality and an ever-increasing role in customer satisfaction. The typical rear seat provides additional occupant seating while striking a balance between the remaining vehicle space provided between the cargo area and the forward seating area. Some rear seats are provided with comfort accessories, such as built-in armrest and center consoles. Most rear seating sections are provided with safety or lap belts. The rear seats come in a number of styles, i.e., bench, bucket, split, and split with center console. Other rear seats are combinations of styles such as a bench upper back section combined with two lower bucket or split sections. Regardless of the seat style, most rear seats have fixed, non-adjustable, lower seat and upper back portions. Each portion of the seat is assembled directly to and inside the passenger compartment of the vehicle. Lap belts are positioned between the seat sections and directly fastened to the vehicle.

Ever increasingly, customer satisfaction has demanded that rear seating become adjustable. However, adjustability has been limited by the style of vehicle and the available rear seating clearance between the cargo area and forward seating area. For trunk type passenger vehicles having a defined cargo section, a fixed wall separates the cargo section and passenger sections from one another. This wall creates the back envelope dimension limitation beyond which the rear seat may not extend. Because of the wall limitation, the seat upper back portion is typically fixed and non-adjustable and the headrests are directly mounted to the wall. In some vehicles, the upper back portion may be reversibly pivotally attached to the lower seat portion enabling a forward adjustment that is limited in its backward travel by the wall. Pivotally connected upper back portions enable cargo area access or allow limited inclination adjustment by the passenger. One such rear seat with limited inclination adjustment within the occupant space is described in U.S. Pat. No. 4,813,721, where a guide is supported by the frame of the automobile such that when the door is opened, the cushion assembly translates towards its most withdrawn position. The rear seat arrangement for this vehicle utilizes valuable cargo space or occupant space to allow for the inclination and seat adjustment.

For hatchback type passenger vehicles having a cargo section, e.g., there typically are no physical barriers, i.e., the wall mentioned above, but the upper back section may act as the divider between the passenger section and the cargo section. Accordingly, the upper seat back section may be reversibly pivotally attached to the lower seat portion enabling a forward or backward adjustment that is limited by the pivot or the floor of the cargo area. One such rear seat is described in U.S. Pat. No. 3,982,787, where the rear back rest is hinged at its lower edge or end to the rear edge of the rear seat proper. The top edge of the rear back seat is guided in substantially vertical guide rails, whereby it is possible to tilt the back seat relative to the horizontal in the manner of a reclining chair simultaneously with the longitudinal adjustment of the rear seat or seats. The rear seat arrangement for this vehicle also utilizes valuable cargo space or occupant space to allow for the inclination and seat adjustment. Additionally, although the headrest of this system is desirably fixed to the upper back section, rotation of the seat section repositions an occupant's torso and head differently with respect to the upper back section and headrest of the seat.

It would be advantageous to have a seat that allows for improved adjustability without the need for rotating the upper back section into (or out of) the passenger or cargo section of the vehicle. Also it would be desirable to have such a seat that advantageously uses the positioning to achieve better torso/head alignment with the upper back section and headrest of the seat.

Furthermore, the typical rear seat enables accessible safety harnesses that are directly attached to the frame of the car to pass between the various seat sections. Because the typical rear seats of a passenger vehicle are commonly positioned within the remaining room of a passenger vehicle and each seat portion is independently assembled during the final stages of the vehicle assembly and manufacture, the safety harness buckle or latch are also independently installed interstitially assembled between the seat sections. It is precisely this independent installation of safety harness components and seat sections that contributes to difficulties in final manufacturing and assembly of rear seating sections requiring multiple assembly operations by the suppliers and OEMs.

Installation of a pre-installation rear seating assembly having a seat or multiple seats, center console or other optional accessories, and each seat outfitted with the appropriate safety harness component would therefore allow for a more efficient and simple automated installation. In addition, a pre-installation rear seating assembly would provide a financial benefit to suppliers of rear seat assemblies by allowing the marketing and sale of a seat assembly from a single seating source. Likewise, a pre-installation rear seating assembly would provide a financial benefit to the OEM, allowing for simplified installation of a seating assembly rather than constituent parts.

SUMMARY OF THE INVENTION

It is, therefore, an object of the present invention to provide a slouch rear seat system with improved adjustability. It is a further object of the present invention to provide a slouch rear seat system that advantageously uses the positioning to achieve better torso/head alignment with the upper seat back section and headrest positioning of the seat. It is yet another object of the present invention to provide a pre-installation slouch rear seat assembly for simplifying the final installation process.

In accordance with the objects of the present invention, a slouch rear seat system is provided. An automotive slouch rear seat includes an upper seat back and a lower seat bottom. The upper seat back includes a fixed rear seat back, a pivotal seat back, and a sliding seat back. The pivotal seat back has an upper end and a lower end for connecting to the lower seat bottom. The sliding seat back is slidably engaged to the fixed rear seat back. The sliding seat back is rotatably engaged to the upper end of the pivotal seat back. The lower seat bottom includes a fixed rear seat bottom, and a sliding seat lower. The sliding seat lower is slidably engaged to the fixed rear seat bottom. The sliding seat lower is rotatably engaged to the lower end of the pivotal seat back.

An automotive slouch rear seat assembly is also provided. The automotive slouch rear seat assembly includes a fixed rear seat back, a fixed rear seat bottom assembly, and one or more slouch rear seat. The one or more slouch rear seat includes an upper seat back and a lower seat bottom. The upper seat back includes a pivotal seat back, and a sliding seat back. The pivotal seat back has an upper end and a lower end. The sliding seat back is slidably engaged to the fixed rear seat back and rotatably engaged to the upper end of the pivotal seat back. The lower seat bottom includes a sliding seat lower. The sliding seat lower is slidably engaged to the fixed rear seat bottom assembly and rotatably engaged to the lower end of the pivotal seat back.

Also, a method of assembling a pre-installation automotive slouch rear seat assembly is provided. The pre-installation automotive slouch rear assembly includes locating a fixed rear seat back, locating a fixed rear seat bottom assembly, and providing one or more slouch rear seat. The pre-installation automotive slouch rear assembly also includes mounting the one or more slouch rear seat to the fixed rear seat back and mounting the one or more slouch rear seat to the fixed rear seat bottom assembly.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 2 is a partial side illustration of a slouch rear seat in an upright position in accordance with the present invention.

FIG. 2A is a partial side illustration of a slouch rear seat in a reclined position in accordance with the present invention.

FIG. 4 is a side view of a slouch rear seat system in accordance with the present invention illustrated in FIG. 1.

DESCRIPTION OF THE PREFERRED EMBODIMENT(S)

Figure 1:
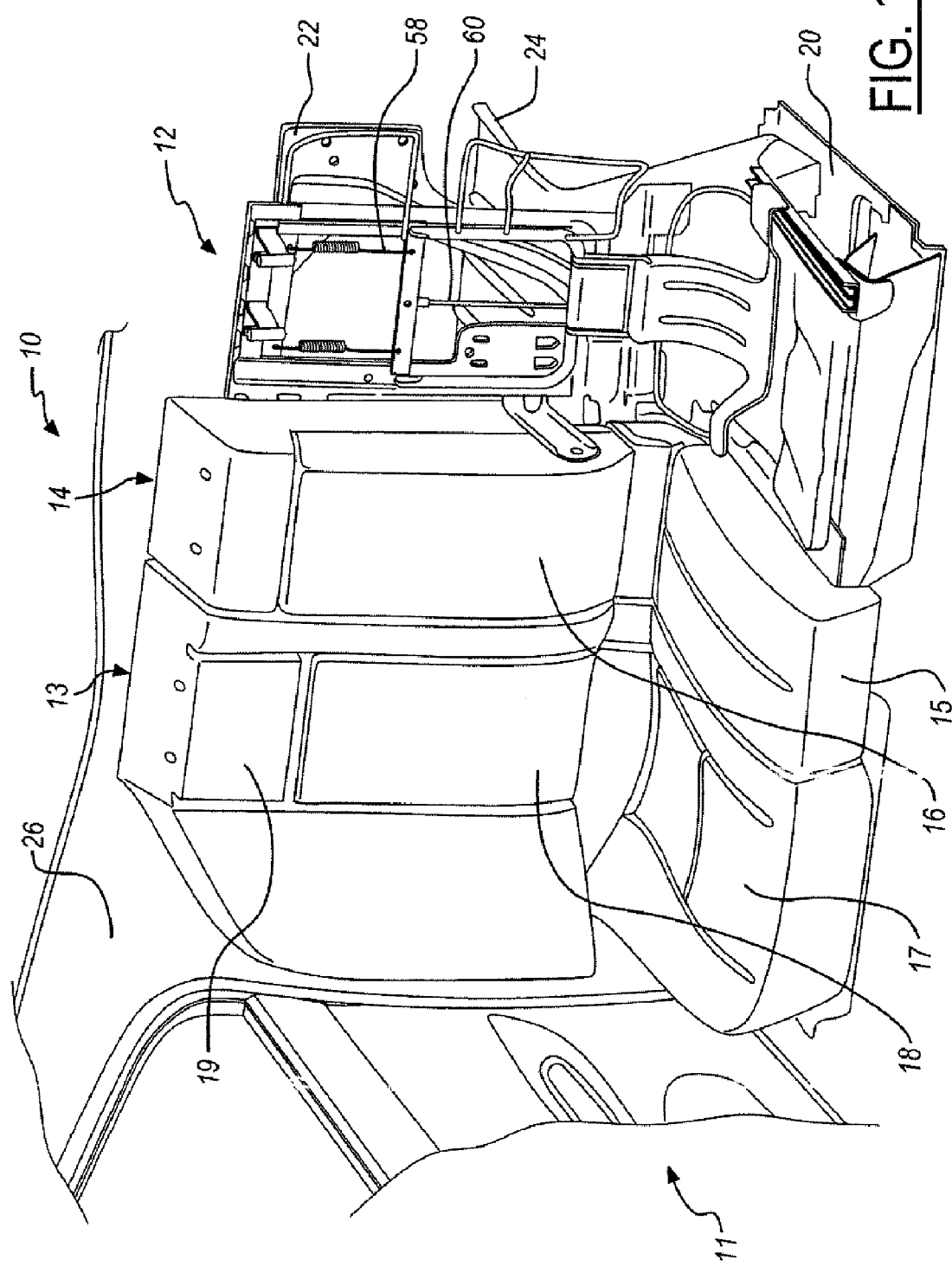
FIG. 1 is a perspective view of a slouch rear seat system mounted in a vehicle in accordance with the present invention.

In accordance with the present invention, FIG. 1 shows a perspective view of a slouch rear seat system 10 mounted in a vehicle 11. The slouch rear seat system 10 in the present embodiment includes a first slouch rear seat 12, a center seat 14, and a second slouch rear seat 13. The center seat 14 and the second slouch rear seat 13 are shown covered with their respective seat cushions 15, 16, 17, 18 and 19. Alternatively, the slouch rear seat system 10 may have one or more slouch rear seat, one or more center seat, or any combination of slouch rear seat and center seat.

The rear seat system 10 may be assembled into and attached to the floor pan 20 and the trunk wall 22. Alternatively, the rear seat system 10 may be assembled into and attached to the trunk pan 24, the side wall 26, the cargo pan (not shown), the cargo wall (not shown) or any other part of a vehicle as would be recognized by a person having ordinary skill in the pertinent art.

In FIG. 2, a partial side illustration is shown of a slouch rear seat 30 in an upright position in accordance with the present invention. The automotive slouch rear seat 30 includes an upper seat back 32 and a lower seat bottom 34. The upper seat back 32 includes a fixed rear seat back 38, a pivotal seat back 36 and a sliding seat back 40. The pivotal seat back 36 has an upper end 46 and a lower end 48. The sliding seat back 40 is slidably engaged to the fixed rear seat back 38 and is rotatably engaged to the upper end 46 of the pivotal seat back 36. The lower seat bottom 34 includes a fixed rear seat bottom 42 and a sliding seat lower 44. The sliding seat lower 44 is slidably engaged to the fixed rear seat bottom 42 and is rotatably engaged to the lower end 48 of the pivotal seat back 36.

The fixed rear seat bottom 42 is positioned nearly horizontal. The fixed rear seat back 38 is positioned nearly vertical. A person having ordinary skill in the art would recognize that the fixed rear seat bottom 42 and the fixed rear seat back 38 may be positioned accommodating a sitting person as is intended by a seating position. Alternatively, the fixed rear seat bottom 42 may be positioned nearly horizontal and coupled to the fixed rear seat back 38 positioned nearly vertical.

Alternatively, the fixed rear seat bottom 42 and the fixed rear seat back 38 of the automotive slouch rear seat 30 may form an obtuse angle with respect to one another.

The slouch rear seat 30 may have one or more headrest post 50 coupled to the sliding seat back 40. The headrest post 50 is positioned upon the sliding seat back 40 to accommodate repositioning of the slouch rear seat 30 without unnecessarily requiring repositioning of a headrest (not shown).

The slouch rear seat 30 as described may further include a headrest assembly (not shown) that is adjustably coupled to the headrest post 50.

The slouch rear seat 30 may include a lower bolster wire 52 coupled to the pivotal seat back 36, an upper bolster wire 54 coupled to the sliding seat back 40, or a cushion wire 56 coupled to the sliding seat lower 44. It is recognized that the various cushion support wires may be included to support the cushions.

The slouch rear seat 30 may further include a first seat cushion (not shown) coupled to the lower bolster wire 52 the pivotal seat back 36. The slouch rear seat 30 may further include a second seat cushion (not shown) coupled to the upper bolster wire 54 of the sliding seat back 40. The slouch rear seat 30 may further include a third seat cushion (not shown) coupled to the cushion wire 56 of the sliding seat lower 44.

The slouch rear seat 30 may further include one or more pull spring 58 (as shown in FIG. 1) retractively coupled between the fixed rear seat back 38 and the pivotal seat back 36 or the sliding seat back 40. The one or more pull spring 58 may oppose the fore motion of the sliding seat lower 44. It is also recognized that positioning of the spring to supply an offset force may be between any fixed part and movable part.

The slouch rear seat 30 may include one or more pull cable 60 (as shown in FIG. 1) coupled between the sliding seat lower 44 and the sliding seat back 40, wherein the one or more pull cable 60 facilitates fore and aft movement of the sliding seat lower 44 and vertical movement of the sliding seat back 40.

The slouch rear seat 30 may include one or more seat belt bracket 100 coupled to the sliding seat lower 44, wherein the seat belt bracket travels with the fore and aft movement of the sliding seat lower 44.

The slouch rear seat 30 may include one or more power seat track 99 (shown in FIG. 4), wherein the sliding seat lower 44 is slidably engaged to the fixed rear seat bottom 42. A person having ordinary skill in the art will recognize that various forms of power seat tracks are acceptable for positioning the seat and retentively retaining the seat position when not powered. Also, a person having ordinary skill in the art will recognize the positioning of the slouch rear seat 30 may be accomplished by using various mechanical, hydraulic, or electrical methods known in the art of seat positioning. Also, it is recognized that once the slouch rear seat 30 is positioned that an engagement device may be used to maintain desired seat position.

FIG. 2A is a partial side illustration of a slouch rear seat 30 in a reclined position in accordance with the present invention. The reclined position is accomplished by positioning the sliding seat lower 44 in the fore direction 64. By positioning the sliding seat lower 44 in the fore direction 64, the first pinned link 66 will translate the pivotal seat back 36 as indicated by the first arrow 63 and the second pinned link 68 will pull the sliding seat back 40 as indicated by the second arrow 65. Alternatively, the slouch rear seat 30 may be positioned in any position between the upright position and the reclined position as illustrated in FIG. 2 and FIG. 2A. A person having ordinary skill in the art will recognize that the slouch rear seat 30 may be positioned in the opposite directions.

Figure 3:
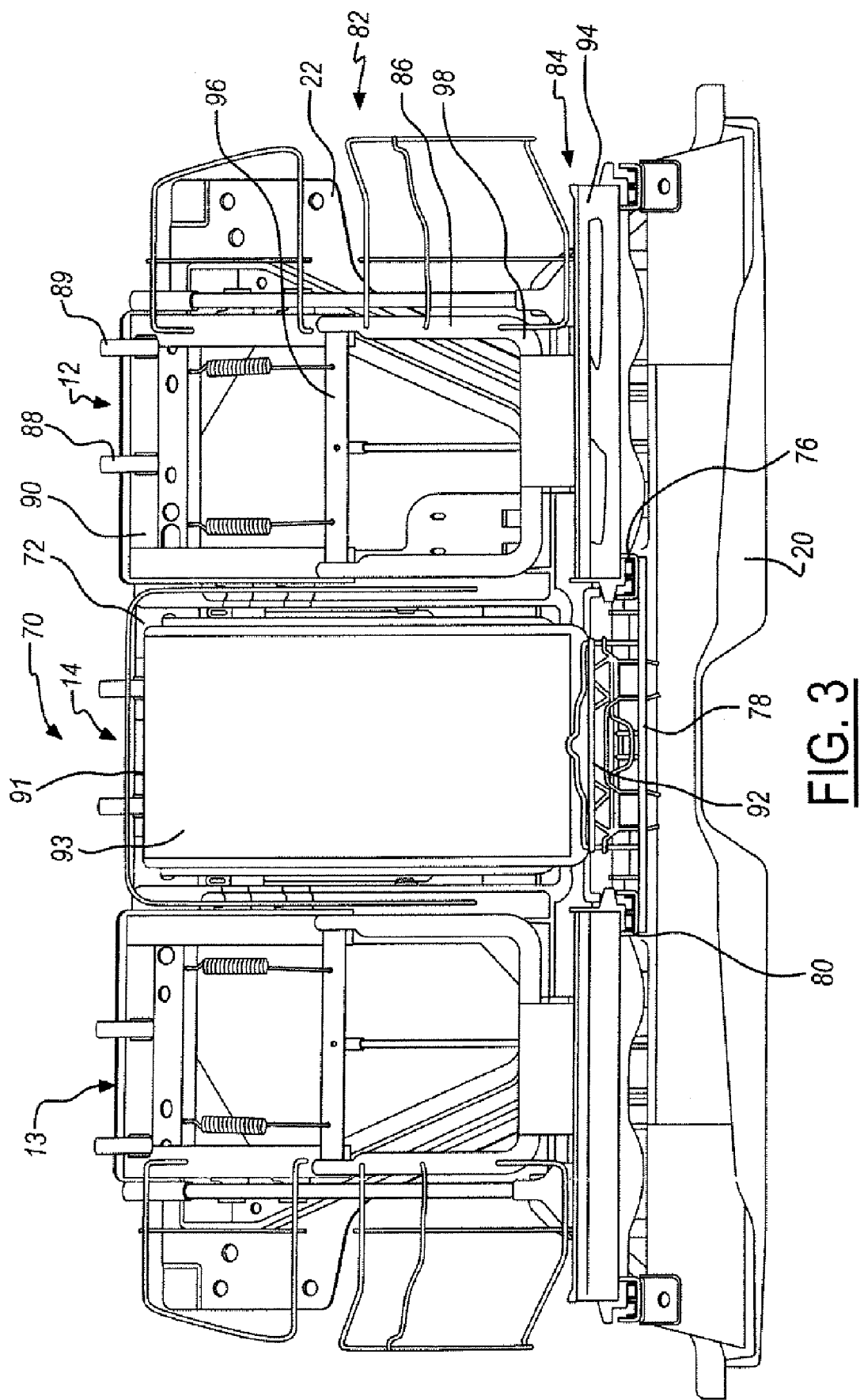
FIG. 3 is a front view of a slouch rear seat system in accordance with the present invention illustrated in FIG. 1.

FIG. 3 is a front view of a slouch rear seat system 10 and FIG. 4 is a side view of a slouch rear seat system 10, both in accordance with the present invention illustrated in FIG. 1. The slouch rear seat system 10 of the present embodiment is a slouch rear seat assembly 70. The slouch rear seat assembly 70 includes a first slouch rear seat 12, a center seat 14, and a second slouch rear seat 13. Alternatively, the slouch rear seat assembly 70 may have one or more slouch rear seat, one or more center seat, or any combination of slouch rear seat and center seat. Additionally the center seat 14 may be eliminated.

The slouch rear seat assembly 70 may be assembled into and attached to the floor pan 20 and the trunk wall 22. Alternatively, the slouch rear seat assembly 70 may be assembled into and attached to the trunk pan 24, the side wall 26, the cargo pan (not shown), the cargo wall (not shown) or any other part of a vehicle as would be recognized by a person having ordinary skill in the pertinent art.

The slouch rear seat assembly 70 includes a fixed rear seat back 72, a fixed rear seat bottom assembly 74, and slouch rear seats 12, 13. The fixed rear seat bottom assembly 74 includes a first adjuster assembly 76, a center bracket 78 coupled to the first adjuster assembly 76 and a second adjuster assembly 80 coupled to the center bracket 78. Each of slouch rear seat 12, 13 includes an upper seat back 82 and a lower seat bottom 84. The upper seat back 82 includes a pivotal seat back 86 having an upper end 96 and a lower end 98 and a sliding seat back 90 slidably engaged to the fixed rear seat back 72 and rotatably engaged to the upper end 96 of the pivotal seat back 86. The lower seat bottom 84 includes a sliding seat lower 94 slidably engaged to the fixed rear seat bottom assembly 74 and rotatably engaged to the lower end 98 of said pivotal seat back 86.

The center seat 14 is positioned between the set of slouch rear seats 12, 13. The center seat 14 may include an upper center seat 91 coupled to the fixed rear seat back 72 and a lower center seat 92 coupled to the fixed rear seat bottom assembly 74. A consol 93 may be included in the upper center seat 91.

Alternatively, the fixed rear seat bottom assembly 74 may include one or more bracket 78 wherein the fixed rear seat bottom assembly 74 may be attachable to a floor pan of an automotive vehicle.

Alternatively, the slouch rear seat assembly 70 as described may have the fixed rear seat bottom assembly 74 positioned nearly horizontal and coupled to the fixed rear seat back 72 positioned nearly vertical.

The slouch rear seat assembly 70 may also include headrest posts 88, 89 coupled to each sliding seat back 90. Also, a headrest assembly (not shown) that is slidably coupled to the headrest posts 88, 89 may be included.

Each slouch rear seat assembly 70 may include a first seat cushion coupled to the pivotal seat back 86, a second seat cushion coupled to the sliding seat back 90, and a third seat cushion coupled to the sliding seat lower 94. Also, each slouch rear seat 12, 13 of the slouch rear seat assembly 70 may include a seat belt bracket 100 coupled to the sliding seat lower 94.

A method of assembling a pre-installation automotive slouch rear assembly 70 includes: locating a fixed rear seat back; locating a fixed rear seat bottom assembly; providing one or more slouch rear seat; mounting the plurality of slouch rear seat to the fixed rear seat back; and mounting the one or more slouch rear seat to the fixed rear seat bottom assembly.

Figure 5:
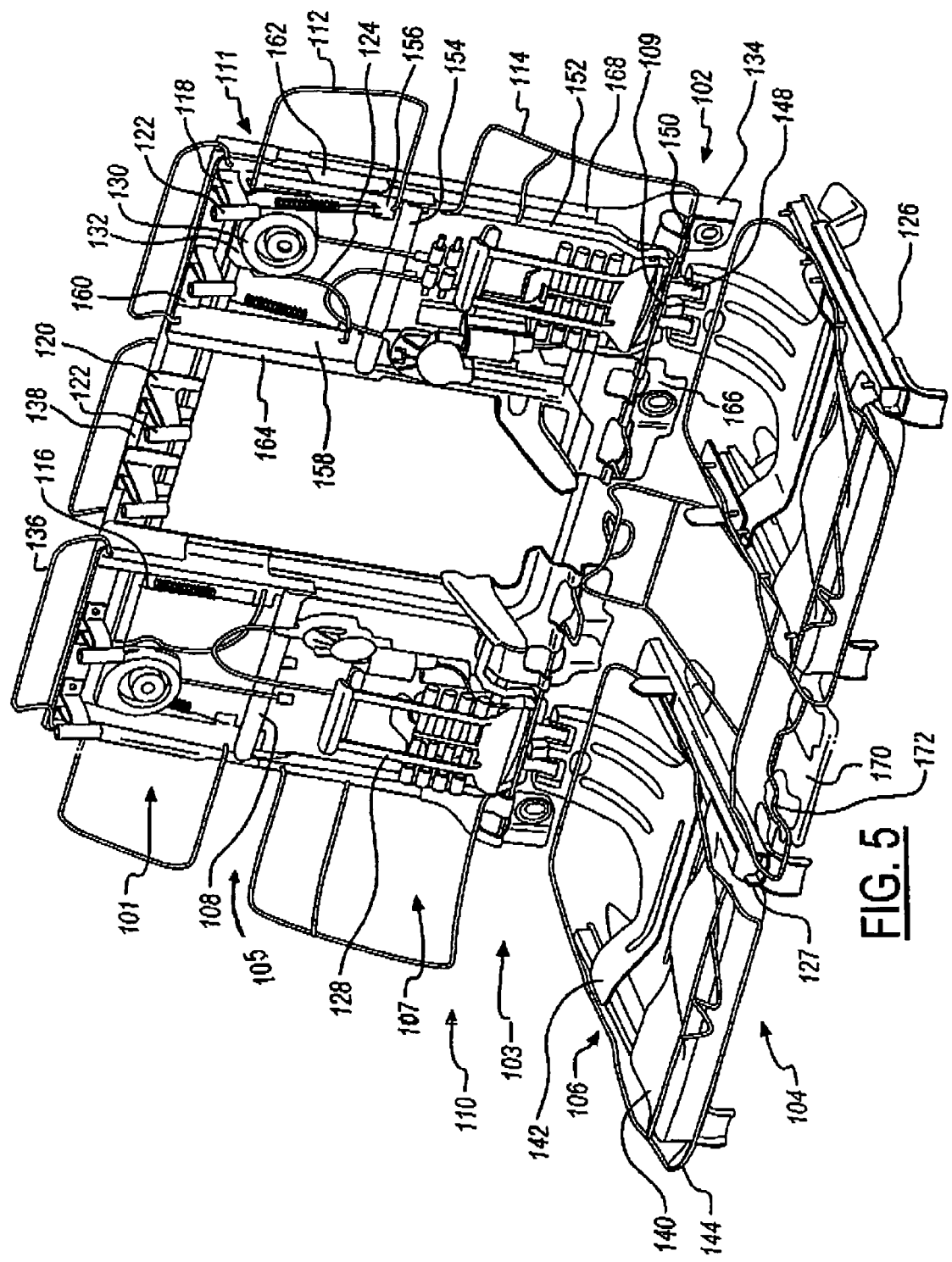
FIG. 5 is a perspective view of a slouch rear seat system assembly in accordance with an alternative embodiment of the present invention.

FIG. 5 is a perspective view of a slouch rear seat system assembly 110 in accordance with an alternative embodiment of the present invention. The slouch rear seat system assembly 110 includes a fixed rear seat back 111, a fixed rear seat bottom assembly 104, and slouch rear seats 102, 103.

The fixed rear seat back 111 includes a top cross bracket 138 coupled to an IB frame bracket 166 and a fixed frame tube 168. The fixed frame tube 168 is coupled to an OB fixed frame foot 134. A center head rest post bracket 120 having head rest posts 122 may be attached to the top cross bracket 138. A fixed frame top wire 136 may be attached to the top cross bracket 138.

The fixed rear seat bottom assembly 104 includes a first adjuster assembly 126, a center bracket 170 coupled to the first adjuster assembly 126 and a second adjuster assembly 127 coupled to the center bracket 170. Also, a center seat wire 172 is coupled to the center bracket 170.

Each of slouch rear seats 102, 103 include an upper seat back 105 and a lower seat bottom 106.

The upper seat back 105 includes a pivotal seat back 107 having an upper end 108 and a lower end 109 and a sliding seat back 101 which is slidably engaged to the fixed rear seat back 111 and rotatably engaged to the upper end 108 of the pivotal seat back 107. The pivotal seat back 107 includes a lower frame structure 152 coupled to an upper pivot bracket 154. An upper frame lower bolster wire 114 may be attached to the lower frame structure 152. The sliding seat back 101 includes an upper frame upper bracket 160, an upper frame RH bracket 156, with a slider RH bracket 162, and an upper frame LH bracket 158, with a slider LH bracket 164, coupled to the upper frame upper bracket 160. The slider RH bracket 162 and slider LH bracket 164 supporting slider bushings (not shown). The slider bushings slidably engage the fixed rear seat back 111 of the slouch rear seat system assembly 110. An upper frame upper bolster wire 112 may be attached to the upper frame brackets 156,158. Also, head rest post brackets 118 having head rest posts 122 may be attached to the upper frame upper bracket 160. Additionally, a fixed frame top wire 136 may be attached to the upper frame upper bracket 160.

The lower seat bottom 106 includes a front pan 140 coupled to a rear pan 142 which are slidably engaged to the fixed rear seat bottom assembly 104. The rear pan 142 includes a cushion pivot sleeve 150 retained by cushion pivot bracket 148. The cushion pivot sleeve is rotatably engaged to the lower end 109 of the pivotal seat back 107. Each lower seat bottom 106 may include a cushion wire 144.

Springs 116 may be attached between the sliding seat back 101 and the fixed rear seat back 111 to facilitate the positionability of the slouch rear seat system assembly 110.

Optionally, a WET blower 130 may be attached to the sliding seat back 101. The WET blower 130 being supported by a WET blower wire 124 and a WET blower bracket 132, which are coupled to the sliding seat back 101.

Optionally, a lumbar massage 128 may be coupled to the pivotal seat back 107.

Although the word "rear" has been used throughout this disclosure, rear is not intended to create any limitation upon the slouch rear seat, the slouch rear seat assembly or the slouch rear seat system as described or claimed.

While particular embodiments of the invention have been shown and described, numerous variations and alternative embodiments will occur to those skilled in the art. Accordingly, it is intended that the invention be limited only in terms of the appended claims.

What is claimed is:

1. An automotive slouch rear seat comprising:
an upper seat back comprising:
a fixed rear seat back;
a pivotal seat back having an upper end and a lower end; and
a sliding seat back slidably engaged to said fixed rear seat back and rotatably engaged to said upper end of said pivotal seat back; and
a lower seat bottom comprising:
a fixed rear seat bottom; and
a sliding seat lower slidably engaged to said fixed rear seat bottom and rotatably engaged to said lower end of said pivotal seat back.

2. An automotive slouch rear seat as described in claim 1 wherein said fixed rear seat bottom is positioned nearly horizontal and coupled to said fixed rear seat back positioned nearly vertical.

3. An automotive slouch rear seat as described in claim 1 wherein said fixed rear seat bottom forms an obtuse angle with respect to said fixed rear seat back.

4. An automotive slouch rear seat as described in claim 1 further comprising one or more headrest post coupled to said sliding seat back.

5. An automotive slouch rear seat as described in claim 4 further comprising a headrest assembly adjustably coupled to said headrest post.

6. An automotive slouch rear seat as described in claim 1 further comprising:
a lower bolster wire coupled to said pivotal seat back;
an upper bolster wire coupled to said sliding seat back; and
a cushion wire coupled to said sliding seat lower.

7. An automotive slouch rear seat as described in claim 6 further comprising:
a first seat cushion coupled to said lower bolster wire of said pivotal seat back;
a second seat cushion coupled to said upper bolster wire of said sliding seat back; and
a third seat cushion coupled to said cushion wire of said sliding seat lower.

8. An automotive slouch rear seat as described in claim 1 further comprising:
one or more pull spring retractively coupled between said fixed rear seat back and said pivotal seat back or said sliding seat back, wherein said one or more pull spring oppose the fore motion of said sliding seat lower.

9. An automotive slouch rear seat as described in claim 1 further comprising:
one or more pull cable coupled between said sliding seat lower and said sliding seat back, wherein said one or more pull cable facilitates fore and aft movement of said sliding seat lower and said sliding seat back.

10. An automotive slouch rear seat as described in claim 1 further comprising one or more seat belt bracket coupled to said sliding seat lower.

11. An automotive slouch rear seat as described in claim 1 wherein said sliding seat lower is slidably engaged to said fixed rear seat bottom by one or more power seat track.

12. An automotive slouch rear seat assembly comprising:
a fixed rear seat back;
a fixed rear seat bottom assembly; and
a plurality of slouch rear seat comprising:
an upper seat back comprising:
a pivotal seat back having an upper end and a lower end; and
a sliding seat back slidably engaged to said fixed rear seat back and rotatably engaged to said upper end of said pivotal seat back; and
a lower seat bottom comprising:
a sliding seat lower slidably engaged to said fixed rear seat bottom assembly and rotatably engaged to said lower end of said pivotal seat back.

13. An automotive slouch rear seat assembly as described in claim 12 further comprising:
a center seat positioned between a set of slouch rear seats, wherein said center seat comprises an upper center seat coupled to said fixed rear seat back and a lower center seat coupled to said fixed rear seat bottom assembly.

14. An automotive slouch rear seat assembly as described in claim 13, wherein said upper center seat comprises a console.

15. An automotive slouch rear seat assembly as described in claim 12, wherein said fixed rear seat bottom assembly comprises a plurality of brackets wherein said fixed rear seat bottom assembly is attachable to a floor pan of an automotive vehicle.

16. An automotive slouch rear seat assembly as described in claim 12 wherein said fixed rear seat bottom assembly is positioned nearly horizontal and coupled to said fixed rear seat back positioned nearly vertical.

17. An automotive slouch rear seat assembly as described in claim 12 further comprising:
one or more headrest post coupled to said sliding seat back; and
a headrest assembly slidably coupled to said headrest post.

18. An automotive slouch rear seat assembly as described in claim 12 further comprising:
a first seat cushion coupled to said pivotal seat back;
a second seat cushion coupled to said sliding seat back; and
a third seat cushion coupled to said sliding seat lower.

19. An automotive slouch rear seat assembly as described in claim 12 further comprising one or more seat belt bracket coupled to said sliding seat lower.

20. An automotive slouch rear seat assembly as described in claim 12 wherein said sliding seat lower is slidably engaged to said fixed rear seat bottom assembly by one or more power seat track.

21. A method of assembling a pre-installation automotive slouch rear assembly comprising:
   locating a fixed rear seat back;
   locating a fixed rear seat bottom assembly;
   providing a plurality of slouch rear seat comprising:
      an upper seat back comprising:
         a pivotal seat back having an upper end and a lower end; and
         a sliding seat back slidably engaged to said fixed rear seat back and rotatably engaged to said upper end of said pivotal seat back; and
      a lower seat bottom comprising:
         a sliding seat lower slidably engaged to said fixed rear seat bottom assembly and rotatably engaged to said lower end of said pivotal seat back; mounting said plurality of slouch rear seat to the fixed rear seat back; and mounting said plurality of slouch rear seat to the fixed rear seat bottom assembly.

* * * * *